3,206,517
PRODUCTION OF CHLOROIODO COMPOUNDS AND CHLOROOLEFINS
Donald M. Fenton, Anaheim, Calif., assignor to Union Oil Company of California, Los Angeles, Calif., a corporation of California
No Drawing. Filed Oct. 8, 1962, Ser. No. 229,173
6 Claims. (Cl. 260—656)

This invention relates to the manufacture of chloroiodo compounds from olefins and to a process for chloroolefins which employs said manufacture of organic chloroiodo compounds as an integral step.

Chloroolefins such as vinyl chloride have established values in the plastic industry. Commonly, vinyl chloride is prepared either from ethylene or acetylene, the latter by addition of hydrogen chloride and from the former by chlorination to ethylene dichloride which is cracked to vinyl chloride and hydrogen chloride. The ethylene process consumes large amounts of elemental chlorine while the acetylene process is based on relatively expensive acetylene.

It is an object of this invention to prepare chloroolefins such as vinyl chloride from olefins without use of elemental chlorine.

It is also an object of this invention to provide a facile preparation of chloroiodo compounds.

Other and related objects will be apparent from the following description of my invention.

I have found that chloroiodo compounds can be readily prepared by contacting an olefin with iodine or hydrogen iodide and oxygen in the presence of heavy metal chloride salts and water. The metal chlorides are maintained in the reaction zone by addition of hydrogen chloride or hydrochloric acid thereto. Relatively mild conditions can be employed with a reaction temperature between about 80° and about 300° C. and a pressure sufficient to maintain the reactants in liquid phase; between about 1 and about 200 atmospheres. Under the aforementioned conditions, the organic chloroiodo compound is readily formed and can be recovered by any convenient separation, e.g., steam distillation, separation of immiscible layers, filtration, etc.

I have further found that when the chloroiodo compound is heated, it decomposes to yield a chloroolefin and hydrogen iodide as the major products. The hydrogen iodide so produced can be readily oxidized to elemental iodine and recycled to the chloroiodination zone. Conveniently, the oxidation of hydrogen iodide to iodine can be combined with the aforementioned chloroiodination step by introducing the hydrogen iodide and an oxygen containing gas into the chloroiodination reactor. In this manner, a preparation of chloroolefins is possible wherein the iodine is employed in a cyclic fashion, with no net consumption of this chemical.

In general, any olefin having a double bond, either terminally or internally positioned, as its only reactive site under the prescribed conditions can be chloroiodinated in accordance with my invention. Examples of various olefins are the cyclic and acylic monoolefins such as ethylene, propylene, butene, isobutene, cyclobutene, pentene, cyclopentene, isopentenes such as 2 methylbutene-1, hexene, cyclohexene, isohexenes such as 2,2-dimethylbutene-2, heptene, cycloheptene, isoheptenes such as 3 methyl, 3 ethylbutene-1, 2 methylhexene-1, octene, isooctenes such as 1,1,4,4 tetramethylbutene-2, 3 methyl, 4 ethylpentene-1, nonene, isononenes, decene, isocenes, etc. Of these, the lower molecular weight olefins, e.g., ethylene through pentene are preferred; ethylene being most preferred because of the established value of vinyl chloride and value of chloroiodoethane as a solvent and/or insecticide.

Because iodine will not readily add to an aromatic under the conditions in the chloroiodination zone, various aryl and alkaryl substituted olefins can also be chloroiodinated by my invention. Examples of such olefins are styrene, allyl benzene, 4 phenylbutene-1, γ-methyl styrene, vinylnaphthalene, 1,5 diphenylpentene-2, 1,2 diphenylpropylene, 1,2 diphenylethylene, etc.

Although the chloroiodo compounds are themselves useful chemicals, e.g., as solvents, insecticides, I have found that they can readily be converted to haloolefins in a cyclic process. To provide a chloroiodo compound which can be pyrolyzed to chloro- or iodoolefins, it is necessary to employ olefins which have at least one hydrogen on one of the carbons sharing the double bond or one of the carbons vicinal thereto. Upon subsequent pyrolysis of the product, the halide can be recovered as hydrogen halide for recycling to the chloroiodination reaction. In this embodiment, the most preferred olefins are those having a hydrogen atom on at least two of the carbons bearing the double bond or vicinal thereto. With these olefins, subsequent pyrolysis of the chloroiodo compound will yield the chloroolefin to the substantial exclusion of any iodoolefin. Examples of such preferred olefins are ethylene, propylene, styrene, etc. to produce vinyl chloride, 2-chloropropylene, γ-chlorostyrene, etc.

As previously mentioned, the chloroiodination is conducted in the presence of heavy metal chloride salts. Chlorides of the following metals are operative:

Zinc and cadmium of Group IIB;
Aluminum, gallium, indium and thallium of Group IIIA;
Tin and lead of Group IVa;
Titanium, zirconium and hafnium of Group IVB;
Bismuth of Group VA;
Vanadium, niobium and tantalum of Group VB;
Chromium, molybdenum and tungsten of Group VIB;
Manganese, technetium and rhenium of Group VIIB; and
The transitional metals, iron, cobalt, nickel, rubidium, rhodium, palladium, osmium, iridium and platinum.

Of the preceding metal chlorides, the preferred are those which are metal chloride Lewis acids, i.e., metal chlorides which have an element which is two electrons short of having a complete valence shell. Included in this grouping are the metal chlorides which are commonly referred to as Friedel-Crafts catalysts. Examples of this grouping which are also Friedel-Crafts catalysts are aluminum chloride, ferric chloride, zinc chloride, bismuth chloride, titanium chloride and stannic chloride. Of these Lewis acids, I have found the most active to be: aluminum chloride, ferric chloride and zinc chloride and, therefore, these metal chlorides are most preferred.

The presence of the proper amount of water in the reaction zone is essential to the chloroiodination reaction. Under anhydrous conditions, e.g., in an inert organic solvent, or with an excessive amount of water in the reaction zone, little or no reaction will occur. In general, the amount of water in the reaction zone should be between about 1 and about 20; preferably between about 3 and about 12 moles per mol of the metal chloride salt.

The reaction temperature for chloroiodination should be between about 80° and about 300° C. Preferably, the temperature should be between about 95° and about 140° C. The reaction pressure can be from one to about 200 atmospheres, as desired. Preferably atmospheric pressures are used; however, if greater olefin solubility is desired, superatmospheric pressures can be used. Because the increased reactor pressure increases the olefin solubility in the reactor medium, higher conversions per pass of olefin are thus possible.

In a preferred embodiment, the reaction temperature is the refluxing temperature at the reaction pressure so that the product can be steam distilled from the reaction zone as it is formed. At a reactor pressure from one to about 5 atmospheres, the corresponding reflux temperature will be between about 90° and 200° C.

The reaction can be conducted on a batch or continuous basis preferably under liquid phase conditions with the water and metal chloride forming an aqueous liquid phase in the reactor. If desired, however, the reaction can also be performed in the vapor phase by distending the metal chloride salt on an inert support such as silica, alumina, zirconia, clays, synthetic aluminum silicates, activated carbon, charcoal, etc., and contacting the distended salt with the olefin, water vapor, hydrogen chloride, and iodine or hydrogen iodide and oxygen. One advantage for vapor phase reaction is that this processing permits the simultaneous pyrolysis of the chloroiodo compound to the haloolefin. In general, higher reaction temperatures are employed for vapor phase reaction, generally between about 120° and 500° C.; preferably between about 150° and 350° C. Use of the higher temperatures, i.e., between about 300° and 500° C. permits the simultaneous cracking of the chloroiodo compound to the haloolefin and hydrogen halide, which thus remains in the reaction zone for further reaction.

The chloroiodo compound produced from liquid phase or the lower temperature vapor phase reaction such as chloroiodoethane, chloroiodopropane, chloroiodobutane, chloroiodooctane, chloroiodostyrene, etc., can be readily recovered by steam distillation and separation of the distillate into an aqueous and organic phase. The organic phase can then be fractionally distilled to obtain the purified chloroiodo compound.

A portion of the liquid phase reactants can be continuously withdrawn from the reactor for steam distillation to recover the chloroiodo product. Unreacted olefin, hydrogen iodide and hydrogen chloride are recovered in the gas phase from the reactor and can, of course, be recycled to further reaction. After distillation, the residue is also recycled to the reaction zone with adjustment of its water content to maintain the proper water concentration in the reaction zone.

The preferred process, however, utilizes steam distillation of the product directly from the reaction zone to remove the chloroiodo compound as it is formed. This procedure also provides a simple control on the water content in the reaction zone in that the water of reaction can be simultaneously removed in the steam distillation with the chloroiodo compound.

I have further found that the chloroiodo compounds can be decomposed to yield chloroolefins in high yields and purity. In general, the dehydroiodination of these compounds is achieved by heating them to a temperature between about 300° and about 550° C.; preferably, temperatures between about 350° and about 500° C. are employed. The pyrolysis can be conducted in the presence of any of the aforementioned inert solids if desired. A suitable method is to admit the chloroiodo compound to the top of a packed column maintained at the aforementioned pyrolysis temperature while passing an inert sweep gas, e.g., nitrogen through the column.

The crude product from hydrolysis comprises the chloroolefin, and hydrogen iodide which can be separated by fractional condensation. The hydrogen iodide is recovered and returned to the chloroiodination zone.

My invention will now be illustrated by the following examples:

Example 1

A flask, equipped with a thermometer, stirrer and condenser was charged with 200 grams of aluminum chloride hexahydrate, 50 grams of iodine and 35 milliliters of water. Ethylene was bubbled into the mixture while heating to 100° C. When the temperature reached about 110°–112° C., a distillate was obtained in the distillate receiver. The reaction was continued for two hours at 115° C. and 46 grams of a crude distillate product was obtained from which pure chloroiodoethane, boiling point 137°–140° C., was separated by distillation.

Example 2

The reaction was repeated with a charge of 200 grams of ferric chloride hexahydrate and 50 grams of iodine. Crude product began to distill when the flask temperature reached 90° C. After 6 hours the temperature reached 109° C. and 51 grams of a crude product was obtained. The yield of chloroiodoethane was 36 grams.

When the reaction was repeated with 16 grams of anhydrous ferric chloride and 25 grams iodine, no liquid condensate was produced over a two-hour period. The flask contents were dissolved in acetone and water was added to precipitate a solid which was found to be ethylene diiodide.

When the reaction was repeated with 2.2 and 3.8 molecular weights of water per molecular weight of anhydrous ferric chloride, chloroiodoethane was again produced.

Example 3

The flask was charged with 150 grams of ferric chloride hexahydrate. While a gas mixture of 80 percent ethylene and 20 percent air was bubbled through the heated salt, 45 milliliters of a 47 percent hydroiodic acid solution was slowly added. Upon reaching a temperature of 118° C., a distillate appeared. After three hours, the flask content's temperature was 122° C. and 7 milliliters of chloroiodoethane was collected.

Example 4

A saturated solution of sodium chloride, 100 grams of sodium chloride in 280 milliliters of water and 50 grams of iodine were charged to the reaction flask and heated to reflux (105° C.) while ethylene was bubbled therethrough. Iodine sublimed and crystallized on the condenser, but substantially no chloroiodoethane was obtained after one hour; the principal product was ethylene diiodide.

When the reaction was repeated with 100 grams of calcium chloride, 50 grams iodine and 90 milliliters of water, substantially no chloroiodoethane was formed after three hours.

Example 5

Ethylene was bubbled through the reaction mixtures listed below while the mixtures were being slowly heated to reflux temperature. In all instances, an organic distillate was recovered from the crude distillate which comprised chiefly chloroiodoethane.

The following reaction mixtures were found to be operative:

100 grams bismuth trichloride, 50 grams iodine and 20 milliliters water;

100 grams chromic trichloride hexahydrate and 50 grams iodine;

100 grams nickel chloride hexahydrate and 50 grams iodine.

Example 6

The flask was charged with 150 grams of ferric chloride hexahydrate and 50 grams of iodine. In separate experiments various olefins were charged to the reactor for a reaction period of three hours during which period the temperature of the reactants was maintained between 100° and 125° C. The olefins charged to the reactor and the products so obtained are listed below.

Products

Olefins:
Propylene --- Chloroiodopropane, mixture of isomers, boiling range 142°–155° C.
Cyclohexene -- Chloroiodocyclohexane.
1-octene ---- Chloroiodooctane, mixture of isomers.

Example 7

A one-inch diameter glass tube, 20 inches long was packed with quartz chips and vertically positioned in a heating oven. The tube was heated to 400° C. and thereafter 50 grams of chloroiodoethane was permitted to slowly drip over the quartz chips in the glass tube. A concurrent flow of nitrogen was passed through the tube as a sweep gas.

The gases from the base of the tube were passed through a trap where iodine vapors were separated and then passed through a dilute sodium hydroxide bath to remove hydrogen iodide. The gases were then cooled and 5 grams of vinyl chloride were condensed and separated. Iodine was also obtained but no vinyl iodide was found.

The preceding examples are intended only to illustrate my invention and are not to be construed as unduly limiting thereof. My invention is intended to be defined by the following claims which define the process steps and their obvious equivalents.

I claim:

1. The preparation of chloroiodo compounds which comprises introducing a hydrocarbon olefin selected from the class consisting of the cyclic and acyclic monoolefins having 2 to about 10 carbons and iodine into contact with a metal chloride selected from the class consisting of chlorides of bismuth, tin, lead, zinc, cadmium, Group IIIA metals, Group VB metals, Group VIB metals, Group VIIB metals, Group VIII metals and mixtures thereof at a temperature between about 80° and about 300° C., a pressure between about 1 and about 200 atmospheres and in the presence of between about 1 and about 20 moles of water per mol of said metal chloride.

2. The method of claim 1 wherein said metal chloride is ferric chloride and between about 3 and about 12 moles of water per mole of ferric chloride are present in said reaction zone.

3. The method of claim 1 wherein said metal chloride is aluminum chloride and between about 3 and about 12 moles of water per mole of ferric chloride are present in said reaction zone.

4. The preparation of an unsaturated organic chloride compound which comprises introducing into a reaction zone, iodine and a hydrocarbon olefin selected from the class consisting of acyclic and cyclic monoolefins having 2 to about 10 carbons having a hydrogen atom on at least two of the carbons bearing the double bond, and vicinal thereto and iodine into contact with a metal chloride selected from the class consisting of chlorides of bismuth, tin, lead, zinc, cadmium, Group IIIA metals, Group VB metals, Group VIB metals, Group VIIB metals, Group VIII metals and mixtures thereof at a temperature between about 80° and about 300° C., a pressure between about 1 and about 200 atmospheres and in the presence of between about 1 and about 20 moles of water per mol of said metal chloride, recovering from said reaction zone an organic chloroiodo compound, subjecting said chloroiodo compound to pyrlysis by heating said compound to a temperature between about 300° and about 550° C. to dehydroiodinate said compound, recovering from said pyrolysis said unsaturated chloride and hydrogen iodide, contacting said hydrogen iodide with an oxygen-containing gas at a temperature between about ambient and about 500° C. to oxidize said hydrogen iodide to iodine and recycling said iodine to said reaction zone.

5. The method of claim 4 wherein said hydrogen iodide and said oxygen-containing gas are introduced into said reaction zone as the source of iodine therein.

6. The method of claim 4 wherein said olefin is ethylene and said unsaturated chloride is vinyl chloride.

No references cited.

LEON ZITVER, *Primary Examiner.*

DANIEL D. HORWITZ, *Examiner.*

UNITED STATES PATENT OFFICE
CERTIFICATE OF CORRECTION

Patent No. 3,206,517                          September 14, 1965

Donald M. Fenton

It is hereby certified that error appears in the above numbered patent requiring correction and that the said Letters Patent should read as corrected below.

Column 6, line 2, for "ferric" read -- aluminum --; line 20, for "pyrlysis" read -- pyrolysis --.

Signed and sealed this 22nd day of March 1966.

(SEAL)
Attest:

ERNEST W. SWIDER                          EDWARD J. BRENNER
Attesting Officer                             Commissioner of Patents